United States Patent
Woggon et al.

(10) Patent No.: US 8,422,529 B2
(45) Date of Patent: Apr. 16, 2013

(54) TUNABLE LASER LIGHT SOURCE BASED ON VARIABLE OPTICAL PULSE EXCITATION AND METHOD FOR OPERATING SAME

(75) Inventors: Thomas Woggon, Karlsruhe (DE); Soenke Klinkhammer, Karlsruhe (DE); Sebastian Valouch, Walldorf (DE); Johannes Bach, Karlsruhe (DE); Uli Lemmer, Karlsruhe (DE)

(73) Assignee: Karlsruher Institut Fuer Technologie, Karlsruhe (DE)

( * ) Notice: Subject to any disclaimer, the term of this patent is extended or adjusted under 35 U.S.C. 154(b) by 250 days.

(21) Appl. No.: 12/859,408

(22) Filed: Aug. 19, 2010

(65) Prior Publication Data
US 2011/0043801 A1 Feb. 24, 2011

(30) Foreign Application Priority Data
Aug. 21, 2009 (EP) .................................. 09010753

(51) Int. Cl.
*H01S 3/06* (2006.01)
*H01S 3/07* (2006.01)

(52) U.S. Cl.
USPC .............. 372/67; 372/20; 372/38.02; 372/30; 372/66; 372/37; 372/10; 372/15; 372/16; 372/17

(58) Field of Classification Search ............. 372/10–17, 372/20, 30, 38.02, 66–67
See application file for complete search history.

(56) References Cited

U.S. PATENT DOCUMENTS

| | | | |
|---|---|---|---|
| 3,959,739 A | 5/1976 | Hutcheson et al. | |
| 4,028,636 A | 6/1977 | Hughes | |
| 4,823,351 A | 4/1989 | Endemann et al. | |
| 4,890,289 A | 12/1989 | Basu et al. | |
| 5,612,967 A * | 3/1997 | Lai | 372/22 |
| 7,202,993 B2 | 4/2007 | Tauser et al. | |
| 2006/0007800 A1 | 1/2006 | Basu | |
| 2006/0146898 A1 | 7/2006 | Tauser et al. | |
| 2006/0274810 A1* | 12/2006 | Steffans et al. | 372/92 |
| 2007/0160093 A1* | 7/2007 | Nishizawa et al. | 372/21 |
| 2007/0248137 A1* | 10/2007 | Basu | 372/67 |
| 2008/0226242 A1 | 9/2008 | Buchter et al. | |
| 2009/0323737 A1* | 12/2009 | Ensher et al. | 372/20 |

FOREIGN PATENT DOCUMENTS

| | | |
|---|---|---|
| DE | 3508707 A1 | 9/1986 |
| WO | WO 2004077142 A1 | 9/2004 |
| WO | WO 2005071483 A1 | 8/2005 |

OTHER PUBLICATIONS

European Search Report for EP09010753, Mar. 5, 2010.

* cited by examiner

*Primary Examiner* — Jessica Stultz
*Assistant Examiner* — Delma R Forde
(74) *Attorney, Agent, or Firm* — Leydig, Voit & Mayer, Ltd.

(57) ABSTRACT

A tunable laser light source having emission wavelengths in a visible or an adjoining spectral region includes a rotationally disposed laser substrate having more than one emission wavelength, a drive unit coupled to the laser substrate, a pulsed light source having a pulse transmitter, a trigger device, and a signal-delay unit. The trigger device, the signal-delay unit and the pulse transmitter are sequentially connected downstream of the drive unit.

8 Claims, 1 Drawing Sheet

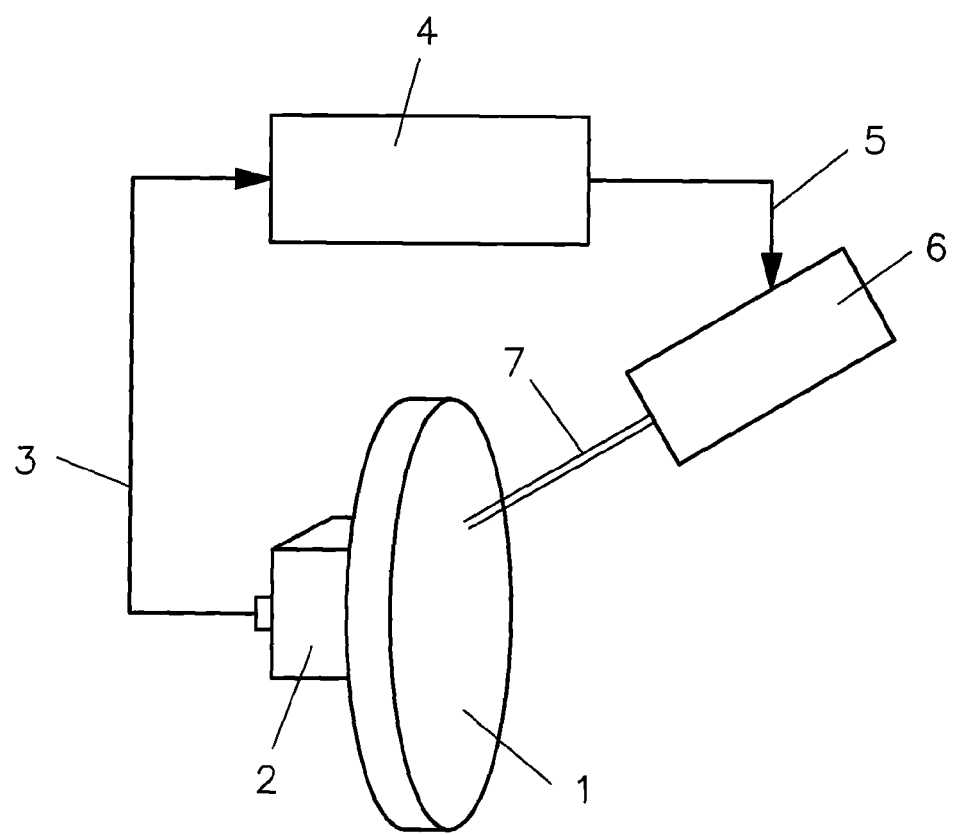

TUNABLE LASER LIGHT SOURCE BASED ON VARIABLE OPTICAL PULSE EXCITATION AND METHOD FOR OPERATING SAME

CROSS-REFERENCE TO RELATED APPLICATIONS

This application claims the benefit of priority under 35 U.S.C. 119 (b) to European Patent Application No. 09010753.3-2222, filed Aug. 21, 2009, which is hereby incorporated herein by reference in its entirety.

FIELD

The invention relates to the field of laser light sources and, in particular, to tunable laser light sources.

BACKGROUND

Tunable lasers are used, for example, in the field of optoelectronics and in spectroscopy. In this context, efforts have been directed, in particular, to providing compact, narrowband laser light sources having rapidly tunable emission wavelengths in the visible spectral region.

At present, this task is mainly fulfilled by the following approaches: dye lasers having a variable external resonator, frequency tripling of the emission of a broadband infrared-emitting laser or white light generation using femtosecond laser pulses.

Dye lasers having a variable external resonator are described, for example, in U.S. Pat. Nos. 3,959,739 and 4,028,636. As an active medium, these laser systems use a fluorescent dye that has been dissolved in a solvent and is optically excited.

International Application Publication No. WO 2004/077142 describes an infrared radiation source which realizes tunable emissions within a specific wavelength range by tripling the frequency of the emission. In addition, it is known from the related art that, by tripling the emission frequency of an erbium fiber laser, it is possible to set a laser emission that is tunable between 495 nm and 650 nm. The frequency tripling is accomplished with the aid of an optical parametric oscillator (OPO). The thermal load on the OPO is reduced by the use of ultrashort-pulse laser systems. In principle, however, the ultrashort-pulse laser systems are precluded from attaining the narrowband characteristic of dye laser systems because of the bandwidth limit. Moreover, the wavelength selection is performed by mechanically adjusting the resonator.

Another approach known from the related art is based on the generation of white light using femtosecond laser pulses, as discussed in the International Application Publication No. WO 2005/071483. Besides the femtosecond laser, these systems also require a special nanostructured optical fiber for generating the white light spectrum, which makes them very complex, both mechanically and optically. In these systems, the emission wavelength can only be selected by filtering out the unwanted spectral components.

All of the approaches mentioned are based on changing the parameters of the optical resonator. Since this must be carried out with exceptional precision, these systems are very complex and place stringent demands on mechanical stability. At present, however, narrow-band laser emission is only attainable through the use of dye lasers.

SUMMARY

In an embodiment, the invention provides a tunable laser light source having emission wavelengths in a visible or an adjoining spectral region. The tunable laser light source includes a rotationally disposed laser substrate having more than one emission wavelength, a drive unit coupled to the laser substrate, a pulsed light source having a pulse transmitter, a trigger device, and a signal-delay unit. The trigger device, the signal-delay unit and the pulse transmitter are sequentially connected downstream of the drive unit.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 1 is a schematic illustrating a device in accordance with an embodiment of the present invention.

DETAILED DESCRIPTION

Embodiments of the invention present a tunable laser light source having emission wavelengths in the visible or an adjoining spectral region that will overcome the enumerated disadvantages and limitations of existing approaches. In particular, a rapid tunability of compact, narrowband laser light sources is made possible. Moreover, a method for operating the tunable laser light source is provided.

In an embodiment, a tunable laser light source is provided that is based on a time-synchronized variable optical pulse excitation. A fundamental idea of the embodiments of the present invention is an arrangement which includes:
  a rotatable laser substrate having a drive unit;
  a trigger device;
  an electronic signal-delay unit; and
  a pulsed light source.

As a rotationally mounted laser substrate, a substrate having a distributed feedback, what is generally referred to as a distributed feedback laser substrate (DFB substrate), is preferably used in the arrangement. Substrates of this kind act both as laser-active material, as well as as a resonator.

In one preferred specific embodiment, the substrate has regions configured on a circular path that feature emission wavelengths which vary as a function of location.

The rotation of the laser substrate is realized by a drive unit. In one preferred specific embodiment of the device, the drive unit is an electric motor, and the pulsed light source is a pump laser.

In an embodiment, the invention provides a method for operating a tunable laser light source comprising setting a laser substrate into a constant defined rotation, outputting a trigger signal by a drive unit, setting a delay of the trigger signal, activating an excitation pulse in response to the delayed trigger signal, directing the excitation pulse at the laser substrate, changing a wavelength of the tunable laser light source by varying an excitation position on the laser substrate by setting the delay of the trigger signal.

To implement the method according to the present invention, in step a), the drive unit sets the laser substrate into a rotation at a constant frequency. The trigger device, which communicates with the drive unit, generates a speed signal, as is indicated in step b). This signal is electronically delayed by the signal-delay unit in accordance with step c) and, as indicated in step d), used as a trigger for an excitation light pulse of the pulsed light source.

Thus, in response to a rotation, a light pulse is emitted which, in accordance with step e), is directed at the laser substrate and, in each instance, impinges on the laser substrate at the same position. A light having a defined wavelength is hereby emitted. The position on the laser substrate resides on a circular path whose radius is determined by the distance of the optical axis of the excitation light to the rotation axis of the laser substrate. The position on this circular path is determined in accordance with step f) by the delay setting on the signal-delay unit.

One particular advantage of the arrangement and of the method is that the only controlled variable is the rotational speed of the laser substrate. This is readily implemented using existing technology, in particular, using electric motors that entail a low degree of complexity. At the same time, there is no longer a need for external resonator mirrors or complex alignment mechanisms, thereby allowing compact systems to be manufactured.

Another advantage of the method is that the pumping light pulses may be readily excited by electronically adapting the delay time. Thus, a position on the laser substrate may be selected and repeatedly excited as a function of the rotation frequency. The rate at which the excitation position and thus the wavelength is changed is primarily dependent on the rotational speed of the laser substrate. By segmenting the surface of the laser substrate into identical subregions, at a given rotational speed, the rate of change of the excitation position may be increased by the particular segmentation factor.

One advantageous use of the method according to an embodiment of the present invention is the photospectrometric analysis of sample material. The laser substrate is excited by time-synchronized pulse sequences which are continuously directed at the substrate within one rotation. The laser light is subsequently directed at the sample material to be analyzed, it only being irradiated in this case using the wavelengths that are characteristic for an identification process.

Optical data transmission via wavelength and/or time multiplex operation constitutes another advantageous use of the method. To this end, the delay time is subdivided into fixed intervals, and these intervals are assigned to a binary bit pattern. The binary bit pattern defines the intervals in which a pumping pulse is sent out.

The present invention is clarified using an exemplary embodiment with reference to FIG. 1. FIG. 1 schematically shows the basic design of the device for implementing the method in accordance with an embodiment of the present invention.

Laser substrate 1 is set into a defined, constant rotation with the aid of drive unit 2. In response to each rotation, the trigger device (not shown in FIG. 1) in drive unit 2 generates a trigger signal 3 that is relayed to signal-delay unit 4. There, trigger signal 3 experiences a delay Δt, which is adjustable. Delayed trigger signal 5 is routed to pulsing light source 6 and activates an excitation pulse 7 that impinges on laser substrate 1.

As a function of the delay time, an excitation pulse 7 impinges on laser substrate 1, in each instance at the same position, in response to each rotation of laser substrate 1, and a defined laser wavelength is emitted. A change in the excitation position and thus in the laser wavelength of the DFB laser is effected by varying delay time Δt.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMERALS 1 laser substrate
2 drive unit
3 trigger signal
4 signal-delay unit
5 delayed trigger signal
6 pulsing light source, pump laser
7 excitation pulse

What is claimed is:

1. A tunable laser light source having emission wavelengths in a visible or an adjoining spectral region, comprising:
   a rotationally disposed laser substrate having more than one emission wavelength and being configured to act as a laser-active material and a resonator without using an external resonator mirror;
   a drive unit coupled to the laser substrate;
   a pulsed light source having a pulse transmitter;
   a trigger device; and
   a signal-delay unit;
   wherein the trigger device, the signal-delay unit and the pulse transmitter are sequentially connected downstream of the drive unit.

2. The tunable laser light source as recited in claim 1, wherein the laser substrate includes regions having emission wavelengths that vary as a function of location.

3. The tunable laser light source as recited in claim 2, wherein the regions are disposed on a circular path that extends about a rotation axis.

4. The tunable laser light source as recited in claim 2, wherein the regions include segmented subregions.

5. The tunable laser light source as recited in claim 1, wherein the pulsed light source is a pump laser.

6. A method for operating a tunable laser light source, the method comprising:
- setting a laser substrate that is configured to act as a laser-active material and a resonator without using an external resonator mirror into a constant defined rotation;
- outputting a trigger signal by a drive unit;
- setting a delay of the trigger signal;
- activating an excitation pulse in response to the delayed trigger signal;
- directing the excitation pulse at the laser substrate; and
- changing a wavelength of the tunable laser light source by varying an excitation position on the laser substrate by setting the delay of the trigger signal.

7. A method for operating a tunable laser light source in accordance with claim 6 further comprising using defined laser wavelengths for photospectrometric analysis of a sample with the tunable laser light source.

8. A method for operating a tunable laser light source in accordance with claim 6 further comprising transmitting data with the tunable laser light source in accordance with a wavelength multiplex method.

\* \* \* \* \*